US011014287B2

(12) United States Patent
Costlow

(10) Patent No.: US 11,014,287 B2
(45) Date of Patent: May 25, 2021

(54) METHODS AND APPARATUSES FOR ADDITIVELY MANUFACTURING RUBBER

(71) Applicant: Bridgestone Americas Tire Operations, LLC, Nashville, TN (US)

(72) Inventor: Douglas B. Costlow, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 7 days.

(21) Appl. No.: 16/577,619

(22) Filed: Sep. 20, 2019

(65) Prior Publication Data

US 2020/0070420 A1 Mar. 5, 2020

Related U.S. Application Data

(62) Division of application No. 14/939,673, filed on Nov. 12, 2015, now Pat. No. 10,456,978.
(Continued)

(51) Int. Cl.
*B29C 64/106* (2017.01)
*B29C 64/245* (2017.01)
(Continued)

(52) U.S. Cl.
CPC .......... *B29C 64/106* (2017.08); *B29C 64/118* (2017.08); *B29C 64/188* (2017.08); *B29C 64/209* (2017.08); *B29C 64/245* (2017.08); *B29C 64/295* (2017.08); *B29C 64/30* (2017.08); *B29C 64/321* (2017.08); *B29C 64/393* (2017.08); *B29C 71/02* (2013.01);
(Continued)

(58) Field of Classification Search
CPC ... B29C 64/118; B29C 2037/80; B29C 64/00; B29C 64/10; B29C 64/188; B29C 64/20; B29C 64/379; B29C 64/106
See application file for complete search history.

(56) References Cited

U.S. PATENT DOCUMENTS 4,962,136 A * 10/1990 Peters ...................... C08L 7/00
523/220
5,121,329 A 6/1992 Crump
(Continued)

FOREIGN PATENT DOCUMENTS

JP 2010125440 A 6/2010

OTHER PUBLICATIONS

Continental Tire Cruises Through Tire Design With ProJet Solution, Google, p. 2, under Solution, 3D Printing, para.2, 3D Systems.
(Continued)

*Primary Examiner* — Atul P. Khare
(74) *Attorney, Agent, or Firm* — Shaun J. Fox; Bryan J. Jaketic

(57) ABSTRACT

A method of additive manufacturing of un-vulcanized rubber includes providing a printing apparatus and providing un-vulcanized rubber to the printing apparatus. The method also includes warming the un-vulcanized rubber and pressurizing the un-vulcanized rubber provided to the printing apparatus to a pressure of at least 800 psi. The method further includes positioning a dispenser at a beginning of a series of motion control commands, dispensing the un-vulcanized rubber from the printing apparatus onto an area, and cutting the dispensed un-vulcanized rubber.

20 Claims, 3 Drawing Sheets

Related U.S. Application Data

(60) Provisional application No. 62/098,419, filed on Dec. 31, 2014.

(51) Int. Cl.

| | | |
|---|---|---|
| *B29C 64/321* | (2017.01) | |
| *B29C 64/295* | (2017.01) | |
| *B29C 64/209* | (2017.01) | |
| *B33Y 70/00* | (2020.01) | |
| *B29C 64/118* | (2017.01) | |
| *B29C 64/393* | (2017.01) | |
| *B29C 64/188* | (2017.01) | |
| *B33Y 10/00* | (2015.01) | |
| *B29C 64/30* | (2017.01) | |
| *B29C 71/02* | (2006.01) | |
| B29C 64/205 | (2017.01) | |
| B29C 48/475 | (2019.01) | |
| B29C 69/00 | (2006.01) | |
| B29K 21/00 | (2006.01) | |

(52) U.S. Cl.
CPC ............. *B33Y 10/00* (2014.12); *B33Y 70/00* (2014.12); *B29C 48/475* (2019.02); *B29C 69/001* (2013.01); *B29C 2071/022* (2013.01); *B29K 2021/00* (2013.01)

(56) References Cited

U.S. PATENT DOCUMENTS

| | | | |
|---|---|---|---|
| 5,303,141 A | 4/1994 | Batchelder et al. | |
| 5,672,380 A | 9/1997 | Uchida | |
| 5,738,817 A | 4/1998 | Danforth | |
| 6,153,034 A | 11/2000 | Lipsker | |
| 6,223,655 B1 | 5/2001 | Shanbaum et al. | |
| 7,625,198 B2 | 12/2009 | Lipson | |
| 8,618,190 B2 | 12/2013 | Burik et al. | |
| 9,126,367 B1 | 9/2015 | Mark | |
| 9,186,846 B1 | 11/2015 | Mark | |
| 9,370,896 B2 | 6/2016 | Mark | |
| 9,511,543 B2 | 12/2016 | Tyler | |
| 9,579,851 B2* | 2/2017 | Mark | B29C 64/118 |
| 9,931,778 B2* | 4/2018 | Bogucki | B29C 48/022 |
| 10,118,375 B2* | 11/2018 | Hickman | B29C 70/24 |
| 10,500,804 B2* | 12/2019 | Bender | B29D 30/0662 |
| 2006/0032569 A1 | 2/2006 | Zimmer et al. | |
| 2006/0096696 A1 | 5/2006 | Oku | |
| 2007/0228590 A1 | 10/2007 | Labossiere et al. | |
| 2008/0047647 A1 | 2/2008 | Raskas | |
| 2009/0229723 A1 | 9/2009 | Ogawa | |
| 2012/0152428 A1 | 6/2012 | Kouno | |
| 2013/0009346 A1 | 1/2013 | Melamed et al. | |
| 2013/0079693 A1 | 3/2013 | Ranky | |
| 2013/0081747 A1 | 4/2013 | Speyer et al. | |
| 2013/0108726 A1 | 5/2013 | Uckelmann et al. | |
| 2013/0186537 A1 | 7/2013 | Ogawa | |
| 2013/0293607 A1 | 11/2013 | Kiaba et al. | |
| 2014/0022302 A1 | 1/2014 | Ogawa | |
| 2014/0232035 A1 | 8/2014 | Bheda | |
| 2014/0284832 A1 | 9/2014 | Novikov et al. | |
| 2014/0328963 A1 | 11/2014 | Mark et al. | |
| 2014/0361460 A1 | 12/2014 | Mark | |
| 2015/0077215 A1* | 3/2015 | Ranky | H05K 3/1258 338/47 |
| 2015/0375455 A1 | 12/2015 | Williams | |
| 2016/0038655 A1 | 2/2016 | Weisman | |
| 2016/0068028 A1* | 3/2016 | Kouno | B29D 30/3028 152/543 |
| 2016/0082641 A1 | 3/2016 | Bogucki | |

OTHER PUBLICATIONS

Continental Tire Cruises Through Tire Design With 3D System 3D Printing Solution, Google, p. 1-2, under Strategy, 3D Printing, para.2, 3D Systems.

Rubber-like 3D print flexible, soft-touch models, Google, Stratasys Ltd.

Bentley Motors from tires to interiors, Bentley designs with 3D printing, Google, Stratasys Ltd.

3D Printing a Rubber Tire with Flex ExoPLA at MakerGeeks.com, Google, Jun. 22, 2013, MakerGeeks.

Cubify 3D printing car wheel in 4 hours, Google, Jun. 6, 2013, Antonio Suarez.

Buildparts's 3D Printed Miller Car, Google, Feb. 27, 2014, Fabbaloo.

Min, In Gyou, International Search Report with Written Opinion from PCT/US2015/057744, 13 pp. (dated Feb. 3, 2016).

\* cited by examiner

METHODS AND APPARATUSES FOR ADDITIVELY MANUFACTURING RUBBER

CROSS-REFERENCE TO RELATED APPLICATION

This application is a divisional of U.S. patent application Ser. No. 14/939,673, filed on Nov. 12, 2015, which in turns claims the benefit of U.S. Provisional Patent Application No. 62/098,419, filed on Dec. 31, 2014. The disclosures of both documents are incorporated by reference herein in their entirety.

FIELD OF INVENTION

The present disclosure is directed to methods and apparatuses for providing shaped objects containing green or un-vulcanized rubber. More particularly, the present disclosure is directed to 3D printing or additive manufacturing methods and apparatuses for providing shaped objects made with green or un-vulcanized rubber. The printed or manufactured rubber may be used in a variety of applications, including tire applications.

BACKGROUND

Known methods and apparatuses of 3D Printing, which is also referred to as additive manufacturing, utilize polymeric materials, such as polyactic acid (PLA), acrylonitrile butadiene styrene (ABS), or nylon, or metals, such as steel. Methods and apparatuses used in 3D printers vary by material used in the printer. Thus, specific methods and apparatus components are implemented to deliver a useful product.

SUMMARY OF THE INVENTION

In one embodiment, a method of additively printing green rubber includes providing power to a printing apparatus and providing materials to the printing apparatus. The materials include green rubber and a plasticizer, such as an additive or oil. The method further includes decreasing a viscosity of at least one of the materials provided to the printing apparatus by warming and pressurizing the green rubber provided to the printing apparatus to a pressure of at least 800 psi. The method also includes identifying a three dimensional structure to be printed by the printing apparatus, identifying a series of motion commands to build the three dimensional structure, and positioning a dispenser at a beginning of a series of motion control commands. The method further includes commencing an iterative build process including steps of dispensing green rubber over an area and separating dispensed green rubber from the dispenser, terminating the iterative build process, and removing the dispensed green rubber from the printing apparatus.

In another embodiment, a method of disposing green rubber includes providing an apparatus having an inlet, a nozzle, a line connecting the inlet to the nozzle, a build surface, and a cutting instrument mounted to the apparatus at a location between the nozzle and the build surface. The method also includes providing green rubber in the inlet, and propelling the green rubber from the inlet, through the line, and to the nozzle. The method further includes heating the green rubber in the line and maintaining a temperature of the green rubber in the line below a predetermined setpoint. The method also includes ejecting the green rubber through the nozzle and onto the build surface, cutting the green rubber with the cutting instrument after the green rubber is ejected through the nozzle, and moving at least one of the nozzle and the build surface.

In yet another embodiment, a method of additive manufacturing of un-vulcanized rubber includes providing a printing apparatus and providing un-vulcanized rubber to the printing apparatus. The method also includes warming the un-vulcanized rubber and pressurizing the un-vulcanized rubber provided to the printing apparatus to a pressure of at least 800 psi. The method further includes positioning a dispenser at a beginning of a series of motion control commands, dispensing the un-vulcanized rubber from the printing apparatus onto an area, and cutting the dispensed un-vulcanized rubber.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. It should also be understood that steps in a method shown as a single step may be replaced with multiple steps, steps shown as multiple steps may be replaced with a single step, and the ordering of certain steps may be varied without altering the method. The drawings are not to scale and the proportion of certain elements may be exaggerated for the purpose of illustration.

DETAILED DESCRIPTION

Figure 1:
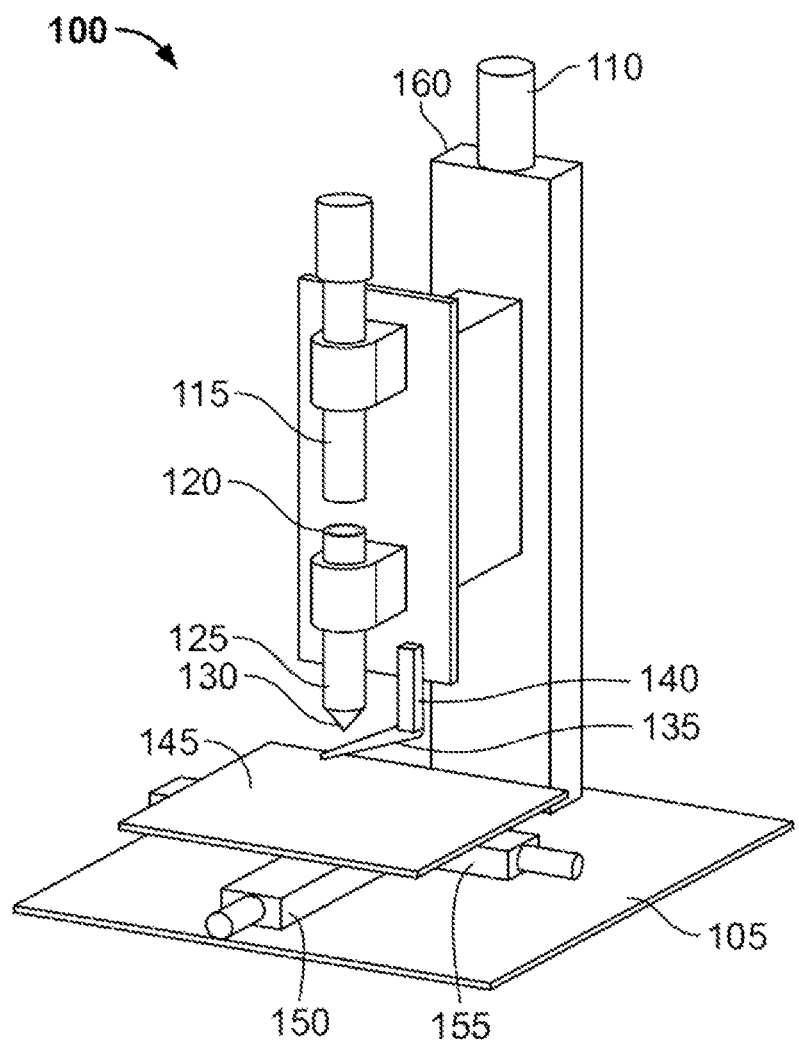
FIG. 1 is a perspective view of one embodiment of an apparatus for 3D printing or additively manufacturing a rubber article.

The following includes definitions of selected terms employed herein. The definitions include various examples and/or forms of components that fall within the scope of a term and that may be used for implementation. The examples are not intended to be limiting. Both singular and plural forms of terms may be within the definitions.

"3D printer" refers to a machine used for 3D printing.

"3D printing" refers to the fabrication of objects through the deposition of a material using a print head, nozzle, or another printer technology.

"3D scanning" refers to a method of acquiring the shape and size of an object as a three-dimensional representation by recording spatial coordinates on the object's surface.

"Additive manufacturing" or "AM" refers to a process of joining materials to make objects from 3D model data, usually layer upon layer, as opposed to subtractive manufacturing methodologies. Additive manufacturing includes 3D printing, binder jetting, directed energy deposition, fused deposition modeling, laser sintering, material jetting, material extrusion, powder bed fusion, rapid prototyping, rapid tooling, sheet lamination, and vat photopolymerization.

"Additive systems" refer to machines used for additive manufacturing.

"Binder jetting" refers to an additive manufacturing process in which a liquid bonding agent is selectively deposited to join powder materials.

"Computer-Aided Design" or "CAD" refers to use of computers for the design of real or virtual objects.

"Computer-Aided Manufacturing" or "CAM" typically refers to systems that use surface data to drive CNC machines, such as digitally-driven mills and lathes, to produce parts, molds, and dies.

"Computer Numerical Control" or "CNC" refers to computerized control of machines for manufacturing.

"Directed energy deposition" refers to an additive manufacturing process in which focused thermal energy is used to fuse materials by melting as they are being deposited.

"Facet" refers to a three- or four-sided polygon that represents an element of a 3D polygonal mesh surface or model.

"Focused thermal energy" refers to an energy source (e.g., laser, electron beam, or plasma arc) that is focused to melt the materials being deposited.

"Fused deposition modeling" refers to a material extrusion process used to make thermoplastic parts through heated extrusion and deposition of materials layer by layer.

"Laser sintering" or "LS" refers to a powder bed fusion process used to produce objects from powdered materials using one or more lasers to selectively fuse or melt the particles at the surface, layer by layer, in an enclosed chamber.

"Material extrusion" refers to an additive manufacturing process in which material is selectively dispensed through a nozzle or orifice.

"Material jetting" refers to an additive manufacturing process in which droplets of build material are selectively deposited. Example materials include, without limitation, photopolymer and wax.

"Powder bed fusion" refers to an additive manufacturing process in which thermal energy selectively fuses regions of a powder bed.

"Rapid prototyping" refers to additive manufacturing of a design, often iterative, for form, fit, or functional testing, or combination thereof.

"Rapid tooling" refers to the use of additive manufacturing to make tools or tooling quickly, either directly, by making parts that serve as the actual tools or tooling components, such as mold inserts, or indirectly, by producing patterns that are, in turn, used in a secondary process to produce the actual tools.

"Reverse engineering," in the additive manufacturing context, refers to a method of creating a digital representation from a physical object to define its shape, dimensions, and internal and external features.

"Sheet lamination" refers to an additive manufacturing process in which sheets of material are bonded to form an object.

"STL" refers to a file format for 3D model data used by machines to build physical parts.

"Subtractive manufacturing" refers to making objects by removing of material (for example, buffing, milling, drilling, grinding, carving, etc.) from a bulk solid to leave a desired shape, as opposed to additive manufacturing.

"Surface model" refers to a mathematical or digital representation of an object as a set of planar or curved surfaces, or both, that may or may not represent a closed volume.

"Tool" or "Tooling" refers to a mold, die, or other device used in various manufacturing and fabricating processes such as plastic injection molding, thermoforming, blow molding, vacuum casting, die casting, sheet metal stamping, hydroforming, forging, composite lay-up tools, machining and assembly fixtures, etc.

"Vat photopolymerization" refers to an additive manufacturing process in which liquid photopolymer in a vat is selectively cured by light-activated polymerization.

While similar terms used in the following descriptions describe similar components and steps, it is understood that because the terms carry slightly different connotations, one of ordinary skill in the art would not consider any one of the following terms to be purely interchangeable with another term used to describe a similar component or step.

FIG. 1 shows a perspective view of a simplified apparatus 100 for 3D printing green rubber. As one of ordinary skill in the art will understand, apparatus 100 could be a 3D printer or additive system.

As shown, the apparatus 100 features a base 105 and support structure 110. As shown, the housing extends from the stabilizing base 105 and partially encompasses part of the support structure 110. In an alternative embodiment (not shown), a housing completely encompasses some, or all of, the support structure. In another alternative embodiment (also not shown), the housing and support structure are an integral unit. In yet another alternative embodiment (also not shown), the housing and support structure are part of an assembly line.

As shown, support structure 110 is a column. Support structure 110, which may be made from a variety of materials, helps keep apparatus 100 upright. Support structure 110 may be mechanized or stationary. In an alternative embodiment (not shown), the support structure is a robotic arm. In another embodiment (also not shown), the support structure is a component of a robotic arm.

Apparatus 100 contains ram 115 and inlet 120. Green rubber is fed into the apparatus, or into a separate reservoir in the apparatus, and ram 115 imparts an applied force that moves the rubber through apparatus 100. Ram 115 imparts an applied force by translating linearly. In a specific embodiment, ram 115 feeds green rubber from an external source through inlet 120 by imparting an applied force that moves green rubber into apparatus 100. As one of ordinary skill in the art will understand, a number of shapes may be used for the ram. In another alternative embodiment (also not shown), the ram is replaced with an extruder (e.g., a screw-driven extruder), a pump, or drive.

In the illustrated embodiment, inlet 120 is round, and its cross sectional area is slightly greater than the cross sectional area of the ram. As one of ordinary skill in the art will understand, a number of shapes may be used for the inlet, and the difference between the inlet and the green rubber introduced to the apparatus may be varied as well. Thus, the external green rubber introduced into the apparatus may be a filament, ribbon, sheet, or other form of matter. In an alternative embodiment (not shown), a single inlet is replaced with two or more inlets. In an additional alternative embodiment (also not shown), the inlet is replaced with an intake that helps move material into the apparatus.

As shown, apparatus 100 also contains barrel 125 that is disposed generally upright. As one of ordinary skill in the art will understand, though, a number of shapes may be used for barrel 125, and barrel 125 could be disposed obliquely rather than upright. In an alternative embodiment (not shown), the barrel is integrated into, or combined with, other components of the apparatus.

The materials in barrel 125 are pressurized. In one embodiment, the materials in the barrel are between 200 and 3,200 psi (roughly 1,378-22,064 kPa). In another embodiment, the materials in the barrel are pressurized to at least 800 psi. A propulsion assembly, such as the ram or an alternative embodiment, can be used to pressurize various chambers in the apparatus.

In further alternative embodiments (not shown), barrel 125 contains mixing elements that agitate the green rubber. Examples of mixing elements include, without limitation, stirrers and impellers. As one of ordinary skill in the art will understand, mixing elements can be incorporated into other components of the apparatus.

Barrel 125 may contain temperature control elements capable of conductive, convective, or radiant heating. In one embodiment, exemplary temperature control elements include, without limitation, resistive heating coils, liquid heating baths, and heat lamps that surround the barrel. Fans or chilled liquids may be used to reduce heat transfer to other parts of the apparatus if cooling is desired. As one of ordinary skill in the art will understand, temperature control elements can be integrated into, or combined with, other components of the apparatus.

With continued reference to FIG. 1, green rubber exits from barrel 125 via nozzle 130. The nozzle 130 directs the flow of green rubber from the apparatus for material extrusion. The nozzle may be fixed or adjustable in size, shape, or orientation. Likewise, the nozzle may be unitary with apparatus 100 or replaceable. The nozzle may also contain temperature control elements. As one of ordinary skill in the art will understand, varying the nozzle properties can impact resolution or volume-performance attributes of the apparatus.

As shown, apparatus 100 contains a cutting instrument 135. Cutting instrument 135 is a metal blade that separates green rubber from the nozzle. Cutting instrument 135 is affixed to the barrel and is controlled remotely (e.g., translated, rotated, or oscillated). In an alternative embodiment (not shown), the cutting instrument is affixed to the support structure. In an additional embodiment (also not shown), two blades are used to separate green rubber from the nozzle. In additional alternative embodiments, the cutting instrument may be, without limitation, a laser, liquid, plasma, or pneumatic cutter. As one of ordinary skill in the art will understand, the cutting element can be integrated into, or combined with, other components of the apparatus.

When a cutting instrument is used, apparatus 100 may contain at least one vibration transducer 140. The vibration transducer 140 may vibrate the nozzle 130 or the cutting instrument 135. Alternatively, the nozzle and the cutting instrument may each utilize a dedicated vibration transducer. As one of ordinary skill in the art will understand, vibrating the nozzle enhances control of material extrusion by reducing friction at the nozzle, and vibrating the cutting instrument allows for a cleaner separation of material from the nozzle. In one embodiment, the vibration transducer operates ultrasonically, around 15-50 kHz. In an alternative embodiment, the nozzle and a metal blade cutting instrument are vibrated concurrently.

Apparatus 100 also contains a build surface 145. Build surface 145 is an object upon which the nozzle disposes green rubber. As shown, build surface 145 is a flat, metal plate. As one of ordinary skill in the art will understand, the build surface may be made from a variety of materials, in a variety of textures. In one embodiment, the build surface is pre-formed to facilitate construction of a particular object. In another alternative embodiment (also not shown), a support surface is used to aide structure retention at the build surface. The support surface may be a simple structure with one surface (curved or flat) or a complex structure with multiple surfaces. In additional alternative embodiments (also not shown), the build surface is made of rubber, and printed green rubber is disposed on this surface. In a specific version of these alternative embodiments, the build surface is a strip of green rubber, such as a base tread layer.

Apparatus 100 also features a plurality of actuators 150, 155, and 160. Actuators 150 and 155 move build surface 145 in a horizontal plane. Actuator 160 moves build surface 145 vertically. Additional actuators may be used to move the barrel or the nozzle. As one of ordinary skill in the art will understand, the actuators used can be varied on an application-by-application basis.

Although not shown in FIG. 1, apparatus 100 may also contain reservoirs for materials used in connection with green rubber. Examples of these materials include, without limitation, oils, plasticizers, and additives. The apparatus may also contain two or more nozzles to facilitate printing a single object with multiple compounds or to facilitate providing various finishes or coatings. Thus, the apparatus could contain a first nozzle loaded with a first compound, and a second nozzle loaded with a second compound. It is generally understood that the apparatus is controlled by an electronic machine, such as a computer or similar device.

Figure 2:
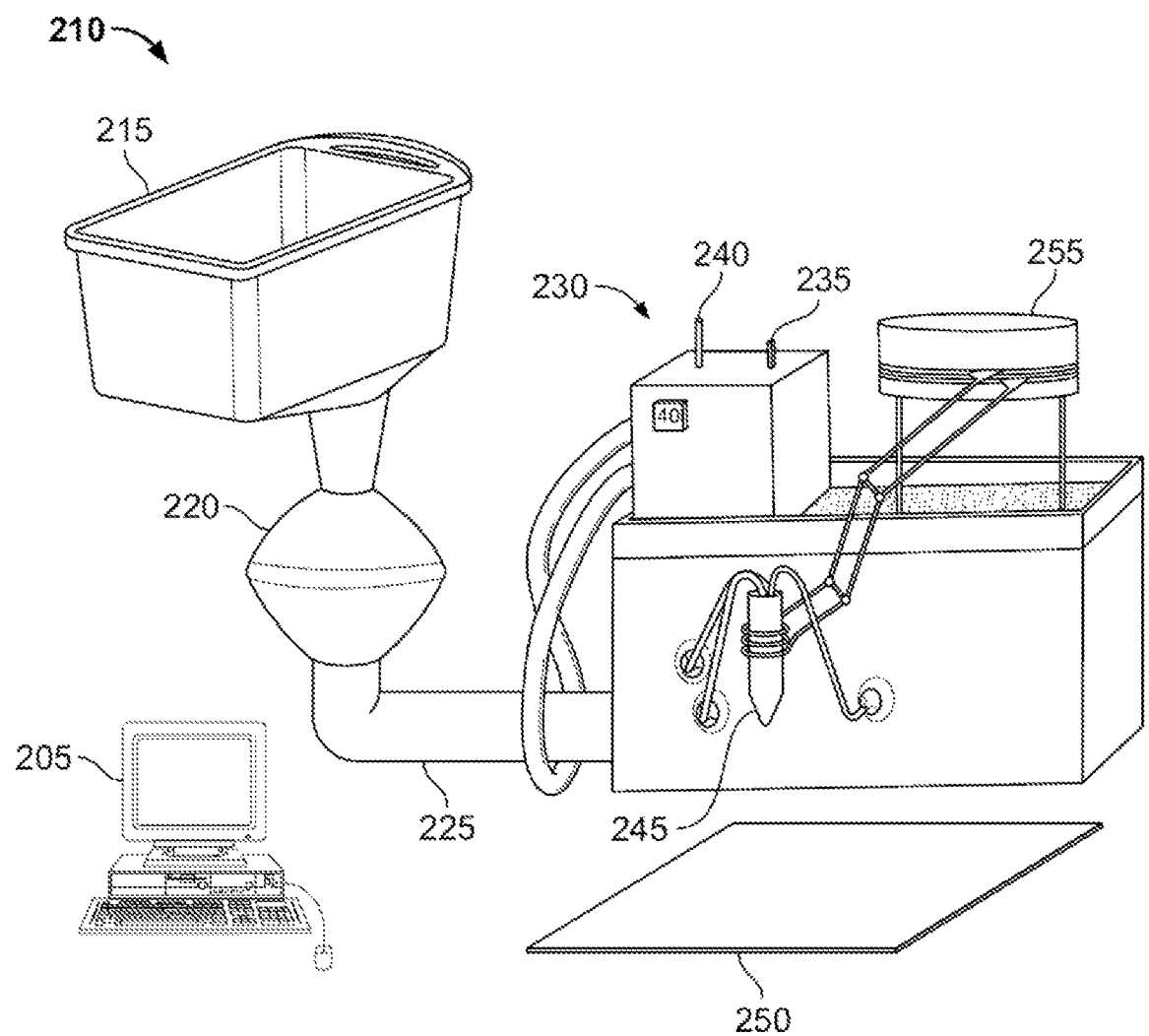
FIG. 2 is a perspective view of a system for the additive manufacturing of rubber.

FIG. 2 is a perspective view of a system 200 for 3D printing green rubber. As one of ordinary skill in the art will understand, system 200 is an additive system, and is not a portable 3D printer.

As shown, system 200 comprises an electronic machine 205 and a printing assembly 210. While the electronic machine 205 is illustrated as a desktop computer, it should be understood that the electronic machine may be, without limitation a computer, a tablet, a smartphone, a programmable logic controller (PLC), a computer numerical control (CNC) machine controller.

Printing assembly 210 comprises multiple components. Green rubber is loaded into hopper 215. The green rubber loaded into the hopper is in granular, pellet, bulk, or sheet form. In alternative embodiments (not shown), other forms of green rubber are used. In another alternative embodiment (not shown), an agitator, such as a stirrer, is used to agitate the green rubber in the hopper. In yet another embodiment, the hopper is replaced with a spool loaded with green rubber.

Printing assembly 210 also comprises feeder 220 that moves green rubber into printing assembly 210 by applying a force that pushes the green rubber down hopper 215. In an alternative embodiment (not shown), the feeder pulls green rubber into the printing assembly. In another alternative embodiment, gravity pulls green rubber in the printing assembly and the feeder regulates the amount of green rubber that enters the printing assembly. In an alternative embodiment utilizing a spool (not shown), the feeder creates movement that allows the green rubber to move into the printing assembly.

Printing assembly 210 further comprises a line 225. Line 225 allows the rubber to move from the hopper (or another starting point). As shown, line 225 is open to hopper 215. In an alternative embodiment (not shown), a rotating door partitions the line from the hopper. As one of ordinary skill in the art will understand, the line may be pressurized, and utilize a valve or pressure regulator is one way to maintain pressure in the line.

Printing assembly 210 also contains a thermal regulator 230 that controls temperature in the line. Thermal regulator 230 includes a temperature sensor 235 and a temperature control element 240. Temperature senor 235 is used to measure the temperature of materials in the line. Alternatively, the temperature sensor may be used to measure the temperature of the line wall, which may be used to estimate the temperature of the materials in the line. Exemplary temperature sensors include, without limitation, thermocouples, resistive temperature devices, thermometers, and infrared sensors.

The temperature observed in temperature sensor 235 is sent to a device that compares the observed temperature to a preset value (or range of values). The comparing device may be, without limitation, an onboard processor on the thermal regulator 230, the electronic machine 205, or an external device (not shown). If the observed temperature is below the preset value, the device sends a signal causing temperature control element 240 to add heat. If the temperature is above the present value, the device sends a signal causing the temperature control element 240 to remove heat or to shut off. As one of ordinary skill in the art will understand, a thermal regulator may be integrated into, or combined with, other components of the apparatus.

Printing assembly 210 further comprises an egress 245 through which the green rubber exits. As shown, egress 245 is an opening. In alternative embodiments (not shown), the egress may be a nozzle or a slit for sheet lamination. In another alternative embodiment (not shown), the egress further comprises a ring and circular blade, akin to a guillotine cutter, that separates rubber from the egress. It should be understood that the egress may be open, partially shut, or fully shut.

Printing assembly 210 further comprises printing surface 250. Material exiting egress 245 is disposed on printing surface 250. In the embodiment shown, the printing surface 250 is a series of rigid, flat planes. In an alternative embodiment (not shown), printing surface 250 is a belt. In additional alternative embodiments (not shown), printing surface 250 is a tire carcass. The tire carcass may be any type of tire.

Printing assembly 210 further comprises a motion control assembly 255 that coordinates movement in the printing assembly. In one embodiment (not shown), the motion control assembly is part of the electronic machine. In another embodiment (not shown), the motion control assembly stands alone from the electronic machine.

Although not shown, printing assembly 210 may further comprise one or more subtractive manufacturing elements. Examples of subtractive manufacturing elements include, without limitation, buffers, carvers, drills, grinders, lasers, and mills.

Although not shown, printing assembly 210 may further comprise a vulcanization chamber that is integral or in close proximity to printing assembly 210. Suitable vulcanization chambers include autoclaves. As one of ordinary skill in the art will understand, alternative vulcanization chambers utilizing known vulcanization methods may be used as well.

Printing assembly 210 receives instructions from electronic machine 205. The instructions for the printing assembly are executed by software. In one embodiment, user input is received at the electronic machine. In another embodiment, input is received at the printing assembly.

The input received includes specifications for a three dimensional object, such as a surface model, preferably in STL (binary or ASCII) or CAD format. The input received may also include information pertaining to the properties of the materials in the printing assembly. In one embodiment of the system, the input information is maintained in a database. The database may include, without limitation, specifications of known tire tread patterns.

Once the specifications are obtained, the electronic machine or motion control assembly coordinates operation of the printing assembly to produce the object. As one of ordinary skill in the art will understand, operation of the printing apparatus may be adjusted according to the properties of the green rubber and other materials in the printing assembly.

The electronic machine or printing assembly may also generate identification information imparted to the printed rubber. This allows organizations or consumers to track the printed rubber. Examples of imparting identification information includes, without limitation, printing an identification number that corresponds to a printing batch.

Figure 3:
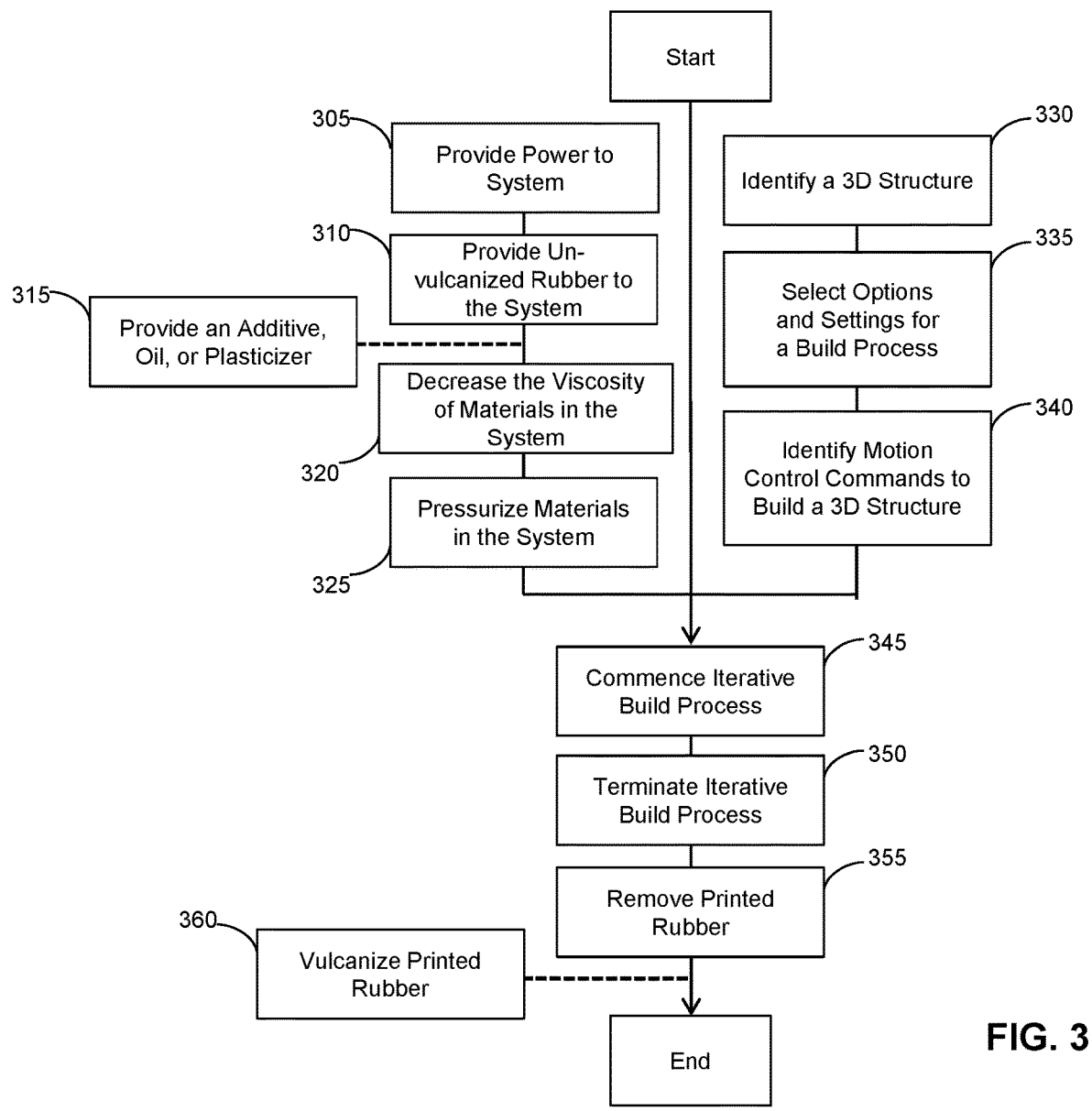
FIG. 3 is a flow chart detailing the steps of a method for additively printing rubber.

FIG. 3 is a flow chart detailing the steps of a method 300 for additively manufacturing green rubber.

In method 300, step 305 comprises providing power to the system. The power may be alternating current or direct electrical current.

In method 300, step 310 comprises providing un-vulcanized rubber to the printing apparatus. As one of ordinary skill in the art will understand, many types of un-vulcanized rubber may be provided to the printing apparatus. In one embodiment, the un-vulcanized rubber may be provided continually. In a second embodiment, the un-vulcanized rubber is provided in batch increments. In either embodiment, the amount of rubber provided to the printing apparatus may be monitored with sensors. Additionally, an alert may be generated when the amount of rubber being provided to the printing apparatus falls below or exceeds predetermined thresholds.

In method 300, step 315 comprises an optional step of providing an additive, oil, or plasticizer to the printing apparatus. The provided additive, oil, or plasticizer, or various combinations thereof, is introduced to the un-vulcanized rubber. In alternative embodiments, additive(s), oil(s), and plasticizer(s) are introduced to the un-vulcanized rubber before the un-vulcanized rubber is provided to the printing apparatus.

In method 300, step 320 comprises decreasing the viscosity of the materials provided to the printing apparatus. In particular, in this step, the viscosity is decreased by warming the materials in the printing apparatus.

In one embodiment in which the materials are warmed, the temperature of the materials in the system does not exceed 100° C. In another embodiment, the temperature of the materials in the system is held below a predetermined threshold. For example, the temperature of the materials in the system may be held below a vulcanization threshold. As one of ordinary skill in the art will understand, the thresholds may vary based on the particular materials that have been introduced into the printing apparatus. In these embodiments, the temperature may be regulated by a setpoint control loop.

In method 300, step 325 comprises pressurizing the un-vulcanized rubber. In one embodiment, the un-vulcanized rubber is pressurized to at least 800 psi (roughly 5,515 kPa). In another embodiment, the un-vulcanized rubber is pressurized between 200 and 3,200 psi (roughly 1,378-22,064 kPa). Pressurizing the un-vulcanized rubber assists moving un-vulcanized rubber into and through the printing apparatus. In an optional step, pressure in the printing apparatus is monitored as a safety precaution. In another optional step, pressure in the printing apparatus is monitored to aid in the control of material extrusion or movement of rubber through the apparatus or as an estimate of the viscosity of the materials in the printing apparatus.

In method 300, step 330 comprises identifying a three dimensional structure, such as a surface model to be printed by the printing apparatus. Exemplary designs include, without limitation, CAD designs and original designs. In one embodiment, the three dimensional structure is obtained via 3D scanning. In an alternative embodiment, the three dimensional structure is obtained via reverse engineering. In another embodiment, the three dimensional structure is obtained from a design database of facet models. Examples of three dimensional structures include, without limitation, bellows, consumer goods, dampers, industrial components (such as gaskets, grommets, or o-rings), shoe components, and tire components (such as a tread or lug).

In method 300, step 335 comprises selecting options and settings for a build process. In this step, options and settings including, without limitation, materials used, and printing resolution are selected.

In method 300, step 340 comprises identifying (or directing creating of) motion control commands to build the three dimensional object. Once the commands are identified, a dispenser is positioned at a starting position.

In method 300, step 345 comprises commencing an iterative build process, where steps of dispensing un-vulcanized rubber and separating un-vulcanized rubber from the dispenser are repeated iteratively. The iterative build process is dictated by the motion control commands of step 340. Optionally, a support may be used to buttress dispensed un-vulcanized rubber. In one embodiment of the iterative build process, the iterative build process further comprises a positioning step that at least moves a dispenser vertically.

In method 300, step 350 comprises terminating the iterative build process. Terminating the build process concludes movement of the dispenser. Optionally, terminating the build process may include a further processing step of applying a coating onto the printed article. In one embodiment, the iterative build process includes a further step of material jetting. In another embodiment, terminating the iterative build process includes a further step of fused deposition modeling, where a thermoplastic is disposed on at least a portion of the printed rubber. In another embodiment, terminating the iterative build process includes a further step of subtractive manufacturing. In yet another embodiment, terminating the iterative build process further includes an optional cooling step.

In method 300, step 355 comprises removing the printed rubber from the printing apparatus. In one embodiment, the removal is performed manually. In another embodiment, removal is automated (such as with a belt or robotic arm).

In method 300, step 360 comprises vulcanizing the printed rubber. In one embodiment, the vulcanization step is a complete vulcanization procedure that produces a final, fully-vulcanized product. In another embodiment, the vulcanization procedure is a partial vulcanization procedure.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of additively printing green rubber to form a tire tread, the method comprising:
    providing power to an additive printing apparatus;
    providing materials to the printing apparatus, the materials including green rubber and a plasticizer, wherein the plasticizer is an additive or oil;
    decreasing a viscosity of at least one of the materials provided to the printing apparatus by warming;
    pressurizing the green rubber provided to the printing apparatus to a pressure of at least 800 psi;
    identifying a three dimensional structure to be printed by the printing apparatus;
    identifying a series of motion commands for the printing apparatus to build the three dimensional structure;
    positioning a dispenser of the printing apparatus at a beginning of the series of motion control commands;
    commencing an iterative build process comprising steps of dispensing the green rubber over an area according to the series of motion control commands and separating the dispensed green rubber from the dispenser;
    terminating the iterative build process; and
    removing the dispensed green rubber from the printing apparatus.

2. The method of claim 1, wherein the iterative build process further comprises moving the dispenser vertically.

3. The method of claim 1, wherein decreasing the viscosity of at least one of the materials includes regulating a temperature provided by said warming using a setpoint control loop.

4. The method of claim 1, further comprising vulcanizing the dispensed green rubber in an autoclave.

5. The method of claim 1, wherein the area over which the green rubber is dispensed is a tread component.

6. The method of claim 1, further comprising utilizing a support to buttress the dispensed green rubber.

7. The method of claim 1, further comprising monitoring an amount of the green rubber in the printing apparatus and generating an alert when the amount falls below or exceeds predetermined thresholds.

8. A method of disposing green rubber by additive manufacturing to form a tire tread, the method comprising:
    providing an apparatus having an inlet, a nozzle, a barrel connecting the inlet to the nozzle, a build surface, and a cutting instrument mounted to the apparatus at a location between the nozzle and the build surface, the barrel configured to be pressurized over a range of 200 to 3,200 psi;
    providing green rubber in the inlet;
    propelling the green rubber from the inlet, through the barrel, and to the nozzle;
    heating the green rubber in the barrel;
    maintaining a temperature of the green rubber in the barrel below a predetermined setpoint;

ejecting the green rubber through the nozzle and onto the build surface;

cutting the green rubber with the cutting instrument after the green rubber is ejected through the nozzle; and moving at least one of the nozzle and the build surface.

9. The method of claim 8, wherein the cutting instrument is a metal blade.

10. The method of claim 8, further comprising vibrating at least one of the nozzle and the cutting instrument.

11. The method of claim 8, wherein the heating of the green rubber in the barrel includes heating the green rubber through resistive heating.

12. The method of claim 8, wherein the propelling of the green rubber from the inlet, through the barrel, and to the nozzle includes applying a pressure of between 200 and 3,200 psi.

13. The method of claim 8, further comprising removing the green rubber from the build surface.

14. The method of claim 13, wherein the removing of the green rubber from the build surface includes using a robotic arm to remove the green rubber from the build surface.

15. A method of additive manufacturing of un-vulcanized rubber to form a tire tread, the method comprising, providing a printing apparatus;

providing un-vulcanized rubber to the printing apparatus;

warming the un-vulcanized rubber;

pressurizing the un-vulcanized rubber provided to the printing apparatus to a pressure of at least 800 psi;

positioning a dispenser of the printing apparatus at a beginning of a series of motion control commands for the printing apparatus to build a three dimensional structure;

dispensing the un-vulcanized rubber from the printing apparatus according to the series of motion control commands onto an area; and cutting the dispensed un-vulcanized rubber.

16. The method of claim 15, further comprising regulating a temperature of the warmed un-vulcanized rubber using a setpoint control loop.

17. The method of claim 15, wherein the cutting of the dispensed un-vulcanized rubber includes vibrating a cutting instrument performing said cutting.

18. The method of claim 15, further comprising identifying the three dimensional structure to be printed by the printing apparatus and identifying the series of motion commands to build the three dimensional structure.

19. The method of claim 15, further comprising utilizing a support to buttress the dispensed un-vulcanized rubber.

20. The method of claim 15, further comprising monitoring an amount of the un-vulcanized rubber in the printing apparatus and generating an alert when the amount falls below or exceeds predetermined thresholds.

* * * * *